United States Patent [19]

Yaniv

[11] Patent Number: 4,935,611
[45] Date of Patent: Jun. 19, 1990

[54] TECHNIQUE FOR OPERATING ELECTRICALLY-POWERED EQUIPMENT IN TIME DEPENDENT MANNER

[76] Inventor: Meir Yaniv, 6 Campus Pl., Scarsdale, N.Y. 10583

[21] Appl. No.: 402,978

[22] Filed: Sep. 1, 1989

Related U.S. Application Data

[63] Continuation of Ser. No. 131,034, Dec. 10, 1987, abandoned.

[51] Int. Cl.⁵ .............................................. G06H 19/00
[52] U.S. Cl. ...................................... 235/487; 235/494
[58] Field of Search ................ 235/375, 462, 487, 494; 209/584

[56] References Cited

U.S. PATENT DOCUMENTS 4,095,095  6/1978  Muraoka .............................. 235/375
4,358,017 11/1982  Erikson ............................... 235/494
4,374,451  2/1983  Miller ................................. 235/375
4,519,522  5/1985  McElwee ............................ 235/462

Primary Examiner—Harold I. Pitts
Attorney, Agent, or Firm—Frishauf, Holtz, Goodman & Woodward

[57] ABSTRACT

A technique for entering data into an electrically powered equipment for operating it in a time-dependent manner. The data is carried on a medium which is normally used in association with the operation of the equipment. For example, if the equipment is taken to be a VCR, then the medium would be the tape cassette for it. Markings carried on the cassette are detected by a scanner for generating the control signals required to operate the equipment in a time-dependent manner. The markings are manually applied by the user to a preprinted card that can be affixed to the cassette.

15 Claims, 11 Drawing Sheets

☐Mon ☐Tues ☐Wed ☐Thr ☐Fri ☐Sat ☐Sun NEXT WEEK ☐
☐1 ☐2 ☐3 ☐4 ☐5 ☐6 ☐7 ☐8 ☐9 ☐10 ☐11 ☐12
ON   ☐:15    ☐:30    ☐:45       ☐ A.M.    ☐ P.M.
☐1 ☐2 ☐3 ☐4 ☐5 ☐6 ☐7 ☐8 ☐9 ☐10 ☐11 ☐12
OFF  ☐:15    ☐:30    ☐:45       ☐ A.M.    ☐ P.M.
CH ☐a ☐b ☐c ☐d ☐e ☐f ☐g ☐h ☐i ☐j ☐k ☐l    110
---TWO EVENTS PROGRAMMING -----==*=  CONTINUATION ☑---
☐Mon ☐Tues ☐Wed ☐Thr ☐Fri ☐Sat ☐Sun NEXT WEEK ☐
☐1 ☐2 ☐3 ☐4 ☐5 ☐6 ☐7 ☐8 ☐9 ☐10 ☐11 ☐12
ON   ☐:15    ☐:30    ☐:45       ☐ A.M.    ☐ P.M.
☐1 ☐2 ☐3 ☐4 ☐5 ☐6 ☐7 ☐8 ☐9 ☐10 ☐11 ☐12
OFF  ☐:15    ☐:30    ☐:45       ☐ A.M.    ☐ P.M.
CH ☐a ☐b ☐c ☐d ☐e ☐f ☐g ☐h ☐i ☐j ☐k ☐l

OFF  ☐ :15   ☐ :30   ☐ :45        ☐ A.M.    ☐ P.M.

CH ☐ a ☐ b ☐ c ☐ d ☐ e ☐ f ☐ g ☐ h ☐ i ☐ j ☐ k ☐ l

- - - - SAME EVENT PROGRAMMING - - - - - = * = = - - - - - - - - - - - - - -

FIRST WEEK    ☐ Mon ☐ Tues ☐ Wed ☐ Thr ☐ Fri ☐ Sat ☐ Sun

SECOND WEEK   ☐ Mon ☐ Tues ☐ Wed ☐ Thr ☐ Fri ☐ Sat ☐ Sun

THIRD WEEK    ☐ Mon ☐ Tues ☐ Wed ☐ Thr ☐ Fri ☐ Sat ☐ Sun

FOURTH WEEK   ☐ Mon ☐ Tues ☐ Wed ☐ Thr ☐ Fri ☐ Sat ☐ Sun

*FIG.12*

TECHNIQUE FOR OPERATING ELECTRICALLY-POWERED EQUIPMENT IN TIME DEPENDENT MANNER This application is a continuation of application Ser. No. 131,034, filed Dec. 10, 1987, now abandoned.

BACKGROUND OF THE INVENTION

This invention is directed to a technique for controlling electronic equipment and, more particularly, to facilitate programming such equipment to operate in a time-dependent manner.

Electronic equipment is being provided with increasingly sophisticated capabilities to operate in a time-dependent manner. For example, the equipment is turned on and off, and/or its operation switched from one function to another, at preset times. A set of controls is provided to enable the consumer to program the equipment in the desired manner. The video cassette recorder (VCR) is a popular example of an appliance operated under time control, although audio tape recorders, cooking devices, and even cleaning devices such as washing machines can also be included in this category. Because the VCR's are perhaps the most widely used example for such time-dependent programming, the following discussion will specifically relate only to VCR's. However, the mention of only VCR's in the following discussion should in no way be interpreted as limiting the invention to that type of equipment.

In order to provide the consumer with a full array of features aimed at maximizing the value and enjoyment of a VCR, the programming and timer systems can be rather complex and, therefore, difficult to learn and operate. Various controls such as buttons, knobs, switches, as well as actuation sequences involving such controls, are required in order to complete a programming setup. Consequently, people who are not technically oriented may experience great difficulty in programming the VCR quickly and correctly. Displays for monitoring the selected settings are typically relatively small and difficult to see clearly. Moreover, the VCR can be placed in a variety of locations some of which may be inconvenient to reach because, for example, the user must stoop down to actuate the controls and to view the display. Furthermore, the particular technique of programming a VCR varies from brand to brand and from model to model. Thus, some confusion and mishandling of VCR's may occur if more than one brand is used in a household or office.

Another disadvantage of the prior art lies in the fact that enabling time-dependent operation requires use of the equipment itself. Thus, all known approaches for programming a VCR require utilization of the VCR itself. Consequently, the capacity of the VCR in terms of memory size, period of time for advance programming, number of events, etc. imposes an upper limit on the usefulness of the programming mode. Also, the VCR itself must, of course, be available to carry out the programming. Thus, programming cannot be done while the VCR is recording, or if it happens to be elsewhere. A significant advantage could be gained if it were possible to store such programming data in a manner other than one depending exclusively on the availability of the VCR.

SUMMARY OF THE INVENTION

It is, therefore, a primary object of the present invention to facilitate the time-dependent programming of electronic equipment.

Another object of the present invention is to utilize the medium associated with a particular type of equipment to implement the setting of time-dependent programming information.

A more specific object of the present invention is to avoid the need to learn specific programming techniques of a particular brand and/or model of equipment.

Another object of the present invention is to avoid the need to operate controls that are conventionally provided on electronic equipment with time-dependent settable functions.

Still another object of the present invention is to enable one person to easily program for the benefit of another.

One other object of the present invention is to make it possible to prepare settings for the time-dependent programming at one location for use at another location.

Yet another object of the present invention is to increase the number of events which can be set beyond the storage capacity of the electronic equipment.

A further object of the present invention is to provide greater assurance that the time-dependent operation will be performed as desired by one operator despite access to the equipment by other operators.

A still further object of the present invention is to allow free access to use of the equipment even after the data to perform the time-dependent operations has been entered.

These and other such objects of the present invention are attained by an apparatus for controlling selected operations of an electrically powered device adapted to be associated with a medium in association with which the device operates, comprising a plurality of designated locations on the medium corresponding to a multiplicity of choices related to at least one of the selected operations. Each of the designated locations is adapted to be marked with indicia indicative that it has been selected. Means is provided for detecting the indicia while the medium is in association with said device along with means responsive to the detecting means for controlling the device.

Another aspect of the invention is directed to control apparatus for use with an electrically powered device having selectively controllable operations, comprising: a card having a plurality of designated locations thereon corresponding to a multiplicity of choices for at least one of the selected operations. Each of the designated locations is adapted to be marked with indicia indicative that it has been selected. A means is coupled to the device for detecting the indicia on the card as the card is brought into an operative association with said device. A means responsive to the detecting means for controlling the device is also provided.

One other aspect of the invention is directed to a method for controlling selected operations of an electrically powered device adapted to be associated with a medium in association with which the device operates, comprising the steps of providing a plurality of designated locations on the medium corresponding to a multiplicity of choices related to at least one of the selected operations, each of the designated locations being adapted to be marked with indicia indicative that it has been selected, detecting the indicia while the medium is in association with the device to generate information signals, and controlling the device in response to the information signals.

Yet another aspect of the invention is directed to method for use with an electrically powered device having selectively controllable operations, comprising the steps of: providing a card having a plurality of designated locations thereon corresponding to a multiplicity of choices for at least one of the selected operations, each of the designated locations being adapted to be marked with indicia indicative that it has been selected, detecting the indicia on the card as the card is brought into an operative association with the device to generate information signals, and controlling the device in response to the information signals.

BRIEF DESCRIPTION OF THE DRAWINGS

FIG. 11 is a second embodiment of a recording card.

FIG. 12 is a third embodiment of a recording card.

DETAILED DESCRIPTION OF THE PREFERRED EMBODIMENTS

Rather than utilizing the myriad controls and complex recording and setup sequences of known approaches, as discussed above, the present invention contemplates the utilization of a programming card removably attachable to a cassette. The programming card can be a recording card containing data to control the time-dependent recording operation, or a setup card to enter general information needed for proper operation such as time and day-of-the-week, or a combination of both. Markings are placed at designated locations on the card. A card which has been suitably marked is secured to the cassette which is then inserted into the VCR. As the cassette travels from the insertion point to its final position within the VCR, a scanner is utilized to read the markings which have been manually applied by the user to the card. The resulting signals are then processed to provide the time-dependent operation of the VCR.

It should be understood that the term "card" is utilized herein for referring to anything capable of retaining markings of any sort applied by a user. Although typically a card is a flat, thin, and rectangular object to which pen or pencil markings can readily be applied, there is no reason why the shape, thickness, and type of material should be so restricted. Also, any type of such marking, such as magnetic for example, can also be utilized.

It must also be mentioned that the term "cassette" is utilized only in the context of a VCR. As indicated above, various other types of electrically powered equipment can also advantageously utilize the principles of the present invention. Accordingly, any medium other than a cassette with which such electrically powered equipment operates is included within this term as it is used herein. For example, if the electrically powered appliance happens to be a microwave oven, then the term "cassette" might in its broadest sense apply to a container into which the food is placed as it is warmed or cooked in the microwave oven. Similar media can readily be found for such use in audio recorders, transmission of data between computers, etc.

Figure 1:
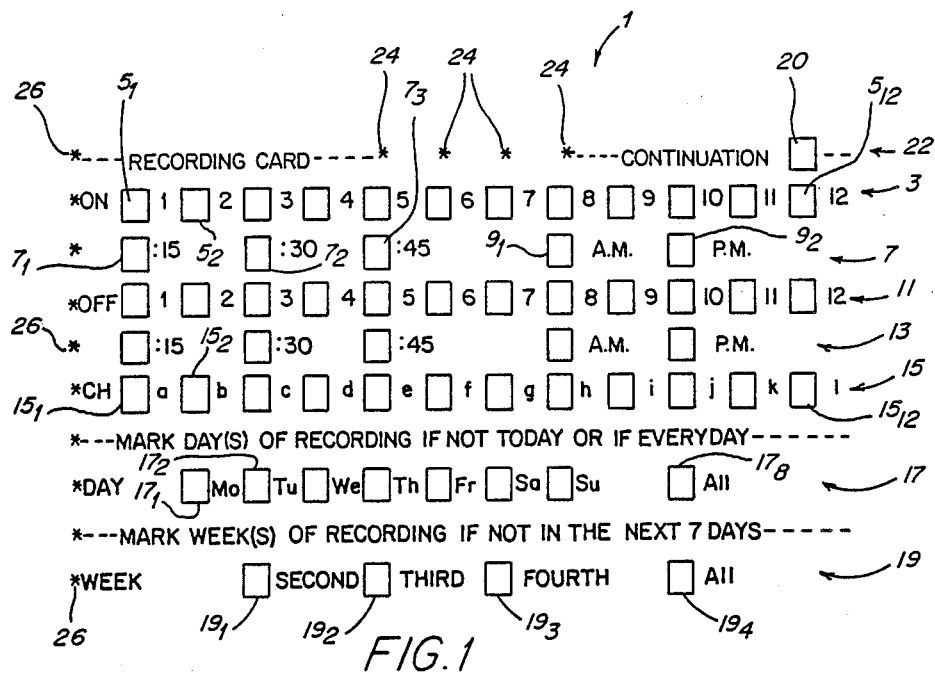
FIG. 1 depicts the layout for a programming card used to program the time-dependent operation of electrically powered equipment.

FIG. 1 depicts the layout of a recording card. Such a card is specifically designed to turn the VCR on and off as well as to select the desired viewing channel. Thus, recording card 1 includes row 3 having boxes $5_1$ to $5_{12}$ each of which designates one-hour of a twelve-hour cycle. Row 7 of card 1 includes two different types of information. On the left-hand side of row 7 are placed boxes $7_1$, $7_2$, and $7_3$ corresponding respectively to 15 min., 30 min., and 45 min. divisions of an hour. If boxes $5_2$ and $7_2$ are blackened, for example, that means that the hour 2:30 has been selected. However, no AM or PM provision has yet been made. Accordingly, the right side of row 7 includes boxes $9_1$ and $9_2$ corresponding to this data.

Rows 11 and 13 of card 1 correspond exactly to rows 3 and 7 thereof. However, whereas rows 3 and 7 are utilized to turn on the VCR, the information in rows 11 and 13 is utilized to turn it off. Row 15 of card 1 includes boxes $15_1$, $15_2$ ... $15_{12}$ corresponding to a plurality of channels available for selection. Rather than channel numbers, these boxes are designated by the letters a, b, ... l. However, by a suitable programming operation which in itself is old and well known in the television and VCR arts, a particular channel number can be entered by the user, depending on the locality, corresponding to each of these boxes.

Row 17 of card 1 designates the day of the week on which the recording is to take place. Thus, the seven boxes $17_1$, $17_2$, ... $17_7$ correspond, respectively, to each one of the days of the week. Box $17_8$ designates the selection of each and every one of the seven days of the week so that repeated recording on every day at the same selected time will occur. If none of the boxes in row 17 is selected, then recording under a default operation will take place on the same day on which the programming data has been entered. Row 19 of card 1 enables the selection of a week other than the one in which the recording operation is completed. Thus, a blackening of box $19_1$ will cause the recording operation to occur in the week following the particular week in which the recording data was entered. If box $19_4$ is blackened, then the recording will take place in each of the four following weeks.

Card 1 also includes a box 20 at its upper right hand corner designated by "continuation". When this box is marked, it indicates to the processing circuitry that the recording information on such card is additional to information already stored from another card. In other words, information on several cards can thus be strung together. If the user wishes to program a plurality of events which occur at different times, this cannot be done with recording card 1 as it is laid out in FIG. 1. Consequently, a number of such cards is required. To take advantage of this feature, a first card 1 is completed, and then input to the VCR. The first event to be programmed is marked on a card which does not have its continuation box 20 marked. Then, the cassette is removed and this first card 1 is retrieved and replaced in pocket 21 with the second recording card. Of course, continuation box 20 on the same card has also been filled in. Cassette 23 is then reinserted into the VCR. This can continue until additional programming of events is no longer desired.

At the top of each card 1, above row 3, is a row 22 which includes four asterisks 24 along with continuation box 20. Asterisks 24 are utilized to identify card 1 as a recording card. Further details are provided below.

At the left side of each of rows 22, 3, 7, 11, 13, 15, 17 and 19 is an asterisk 26. Asterisks 26 perform a timing, or synchronization function as described in detail below.

Figure 3:
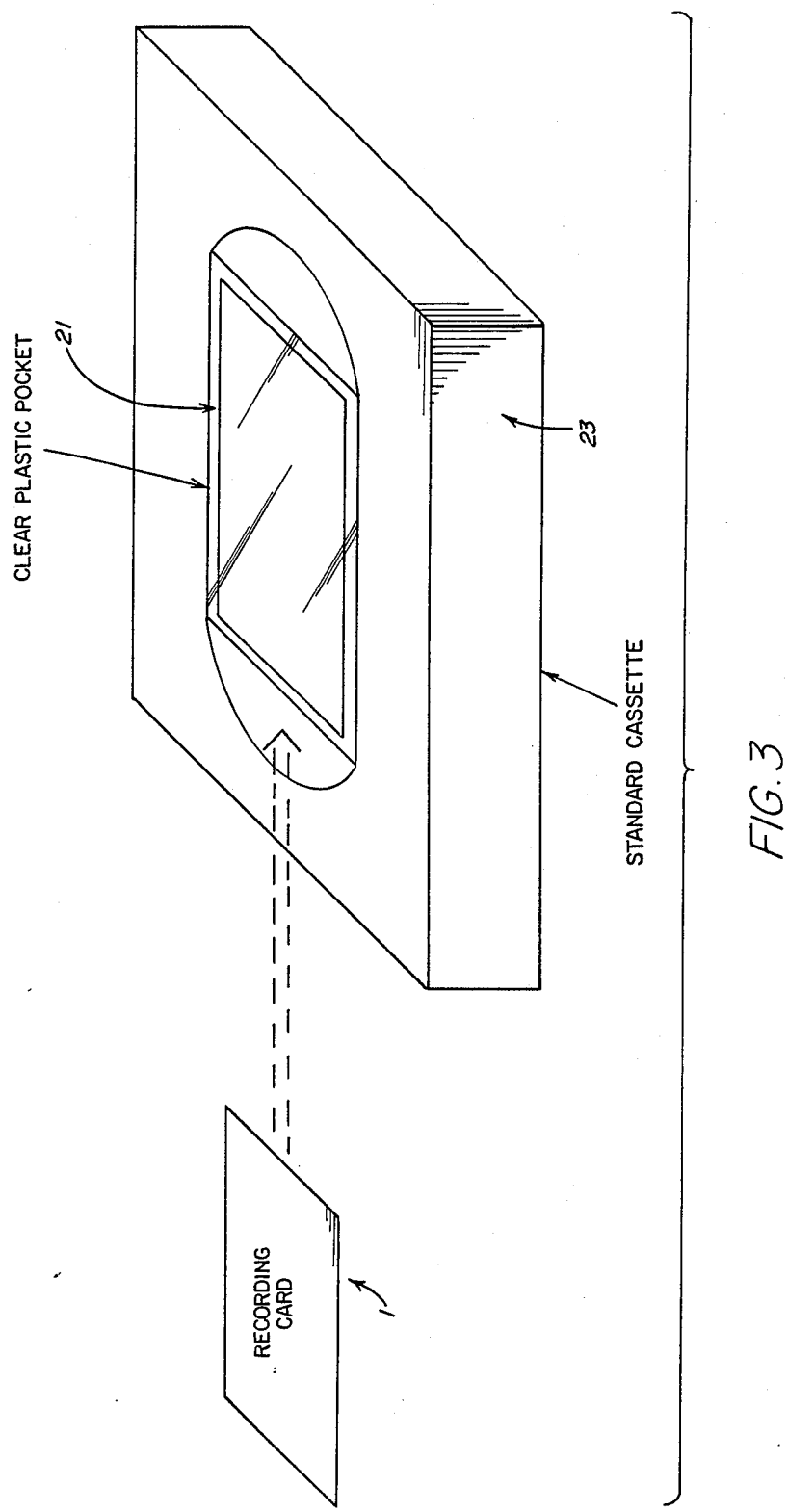
FIG. 3 is a perspective view of a VCR cassette upon which a pocket has been provided to receive a programming or a setup card.

Card 1 provides an easy-to-use means for quickly, conveniently, simply, and consistently programming the VCR regardless of its controls, settings, operational sequences, and brand. All that needs to be done is to adequately blacken, or fill in, boxes in appropriate ones of rows 3, 7, 11, 13, 15, 17, and 19. The completed card is then secured to the cassette. An example of how this is done is depicted in FIG. 3. Recording card 1 fits snugly, yet easily, in pocket 21 fixed to cassette 23. The upper side of pocket 21 is transparent so that a scanner of the optical type (discussed below) will be able to read the markings on card 1. Of course, this transparency is not required if the card and markings are such as to not require it. For example, magnetic type markings and a corresponding type of scanner do not require a transparent upper side of the pocket 21 but may require certain other appropriate characteristics.

Figure 4:
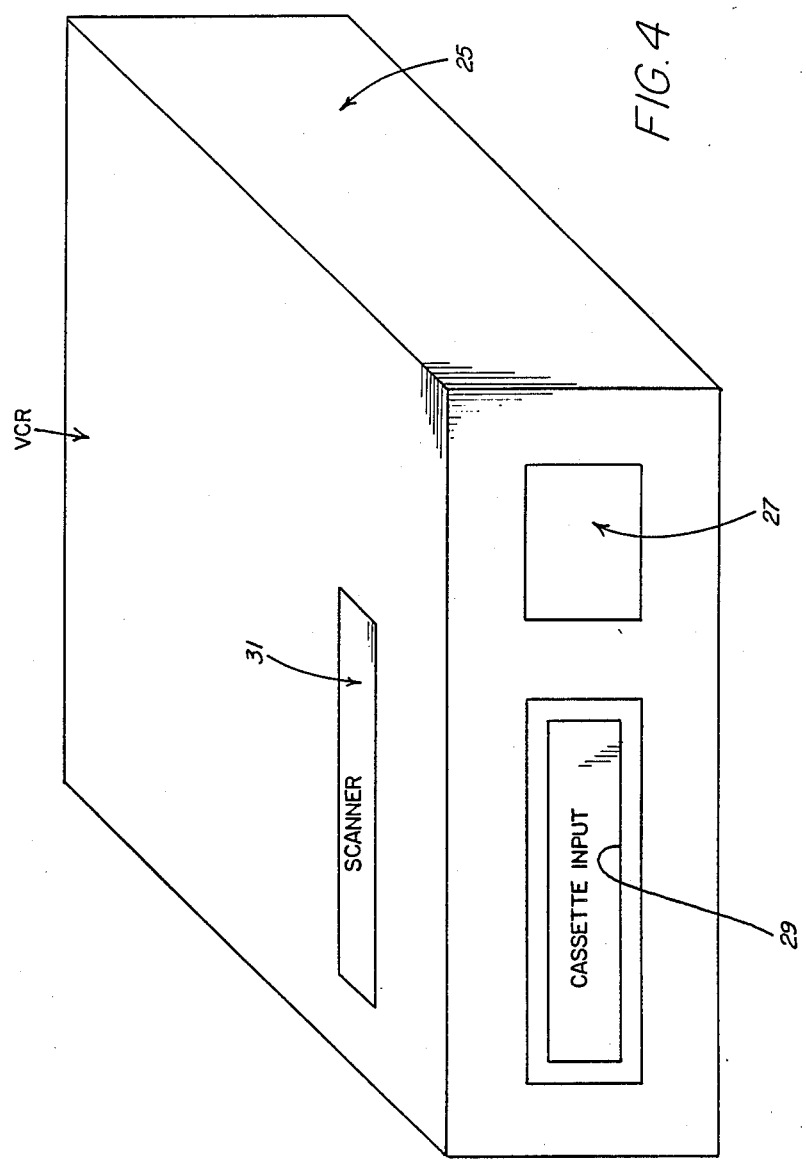
FIG. 4 is a perspective view of a VCR modified in accordance with the present invention.

As shown in FIG. 4, a conventional VCR 25 contains various controls as well as a display, all of which are generally designated as 27. It also includes an opening 29 adapted for receiving cassette 23. Opening 29 can also accomodate pocket 21 and card 1 carried within it because the latter are suitably sized so as to protrude minimally above cassette 23. Furthermore, conventional VCR 25 is modified with the addition of scanner 31. Scanner 31 is preferably of the optical type and includes means for illuminating card 1 and corresponding means for detecting the light reflected from it. Thus, a box on card 1 which has been blackened will reflect considerably less light than the remaining surface of the card. This differential is detected by one of the sensors 33 in the scanner. Twelve such sensors 33 are required for the scanner 31 to read the 12 columns on card 1. One additional sensor is required to read asterisks 26. The thirteen sensors 33 are aligned transversely across the VCR.

Scanner 31 is of a type which is conventional and well known in the art. These can be relatively small so as to intrude minimally into the interior space of VCR 25. Typically, the upper portion of VCR 25 where scanner 31 is shown as being located contains adequate room to easily accomodate scanner 31. However, this particular location for scanner 31 is not critical. If a particular position other than the one depicted is deemed to be preferable, then pocket 21 can simply be attached to the corresponding position on cassette 23 so that the programming card can be read by the scanner. For example, if it is preferred to have scanner 31 placed at the bottom of VCR 25 rather than on its top, this can of course easily be done. Likewise, pocket 21 can also be placed on a sidewall of cassette 23 if a better position for scanner 31 is thought to be in the interior of VCR 25. In such a case, programming card 1 may have to be somewhat elongated to fit on the side of the cassette and so that all the required information can be accomodated on it.

Figure 2:
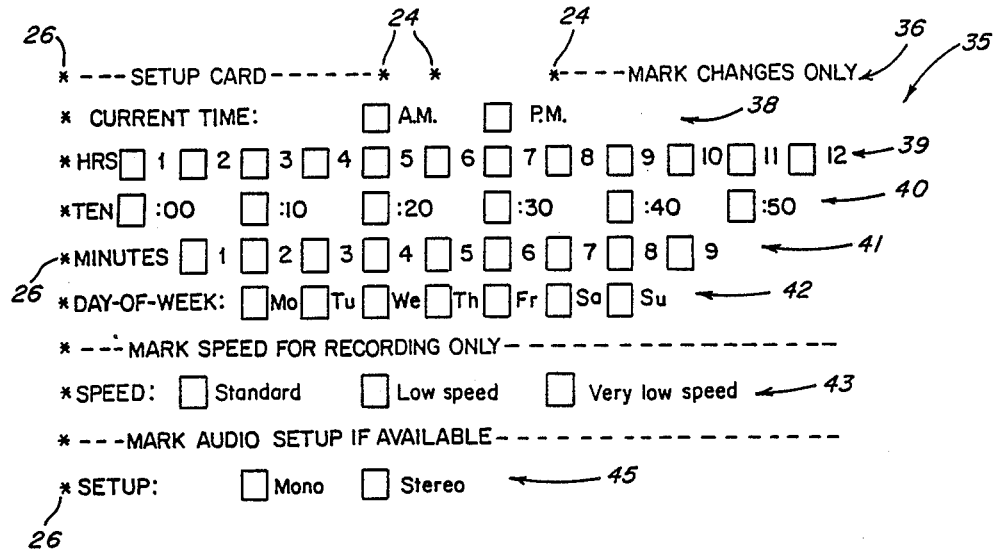
FIG. 2 depicts the layout for a setup card used to set up selected parameters to generally enable the correct operation and programming of the electrically powered equipment.

FIG. 2 depicts a layout for a setup card 35. As has been done with recording card 1, setup card 35 includes an array of boxes designed to be blackened to indicate the selection of a particular one. Setup card 35 is utilized to provide general information to the VCR such as the time of day, and the day of the week. Specifically, row 38 includes the AM and PM information while rows 39, 40, and 41 provide the hours, tens of minutes and single digit minutes, respectively. Row 42 can be used to specify the time of day. In addition to this data, row 43 is provided for selecting the recording speed of the VCR. Also, row 45 is provided to enable selection of the audio between mono and stereo. This information is believed to be self-explanatory, and thus no further details are believed needed.

Setup card 35 includes above its row 38 a row 36 of three asterisks 24. These asterisks 24 are used to identify the card as a setup card. Also, each of rows 36, 38, 39, 40, 41, 42, 43 and 45 has at its left side an asterisk 26. Further details regarding asterisks 24 and 26 are provided below.

Figure 5:
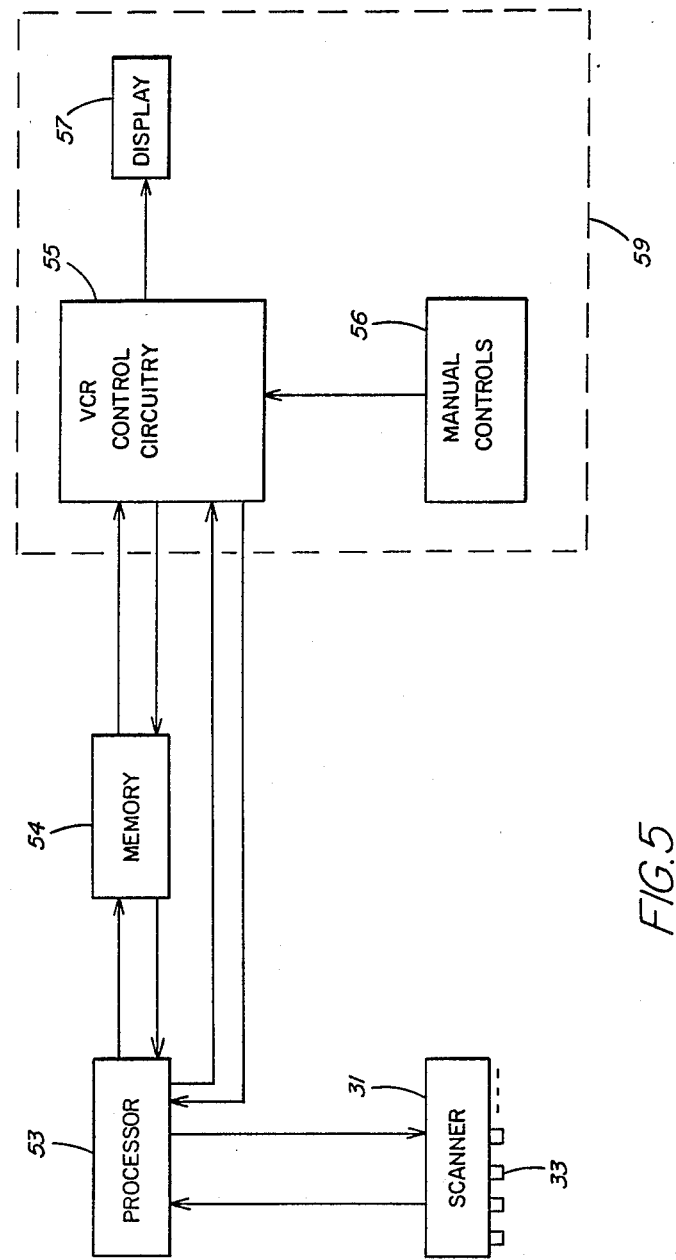
FIG. 5 is a circuit block diagram in accordance with the present invention.

A conventional type of VCR is configured within broken lines 59. Manual controls 56 are utilized in the conventional fashion to set programming information into VCR control circuitry 55 for viewing on display 57. Display 57 is part of the means 27 depicted in FIG. 4. VCR control circuitry 55 performs all the control operations required to operate a VCR in the well known manner. The remaining blocks depicted in FIG. 5 are related in particular to the present invention. Scanner 31, already discussed above, receives control signals from a processor 53. As scanner 31 detects data stored on a programming card, the detected information, which includes programming data as well as timing pulses, is input to processor 53. A memory 54 is in communication with processor 53 to, for example, store the programming data detected by scanner 31. Memory 54 is also in communication with VCR control circuitry 55 to, for example, convey the stored programming information in order to enable the time-dependent operation of the VCR. Processor 53 and VCR control circuitry 55 are also in communication with each other. VCR control circuitry 55 activates the processor 53 when, for example, it is sensed that a cassette has been inserted into the VCR. Processor 53, on the other hand, conveys to VCR control circuitry 55, for example, timing information it has obtained from scanner 31.

Processor 53 can be an off-the-shelf microprocessor suitably programmed in accordance with the flow charts of FIGS. 6-10. Likewise, memory 54 and scanner 31 can be off-the-shelf devices. The elements depicted within the broken lines 59 are, as stated above, conventional in that they are used already in VCR's available to the public.

Figure 6:
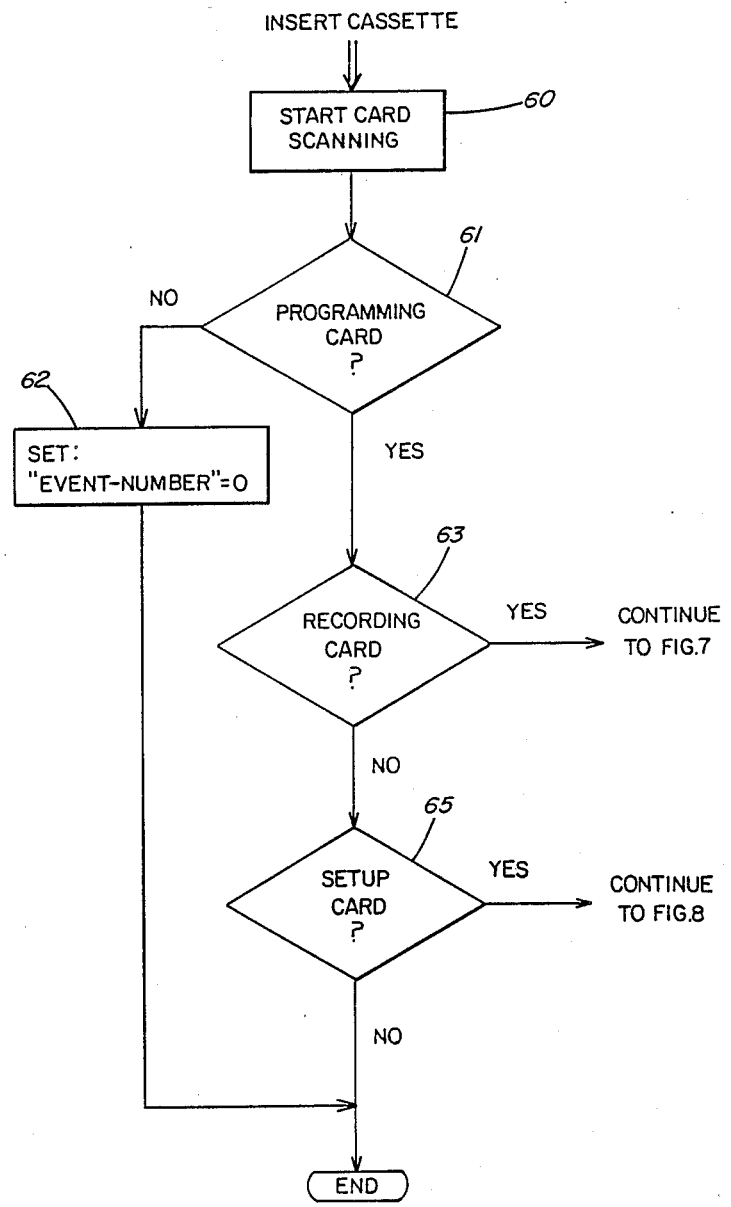
FIG. 6 is a flow chart showing the basic steps followed to program and/or, set up the electrically powered equipment.

Operation of the circuitry depicted in FIG. 5 will now be described with respect to the flow charts in FIGS. 6-10. Turning first to FIG. 6, it provides an overview of the steps utilized to program and/or set the VCR. Specifically, with cassette 23 (carrying recording card 1 or setup card 35) being within VCR 25, scanning of the card is started, as per box 60. This scanning operation entails the utilization of VCR control circuitry 55 to determine that a cassette has been inserted into the VCR. Such a determination can be made with the use of a microswitch (not shown) which is tripped by the cassette 23 as it reaches a particular point along its path into the VCR. At that instant, the processor 53 is readied for operation and it, in turn, actuates scanner 31. Also, synchronization of the scanning operation is facilitated by the asterisk markings 26 on the card. In other words, the signal generated as a result of each asterisk 26 passing under the leftmost scanning head 33 is utilized to synchronize reading of the card rows with the operation of the remaining circuits. Techniques for implementing the above are well known in the art and, as such, this aspect of the invention is not deemed to require further details.

Decision box 61 is used to determine whether cassette 23 carries a programming card, that is to say either of cards 1 or 35. Asterisks 24 are utilized for this purpose. Processor 53 is programmed to expect either three or four asterisks 24. If a number other than three or four is sensed, e.g. zero, then it is determined that no events are to be programmed with this technique. A zero is sensed if no signal is received within a preset time period starting with, for example, tripping of the above-mentioned microswitch. Accordingly, an event number of zero is inserted into an appropriate memory location of memory 54, as per box 62. If, however, decision box 61 determines that either of cards 1 and 35 is secured to cassette 23, then the process continues to decision box 63. A determination is made as to whether the card secured to cassette 23 is recording card 1. This is done based on whether the number of detected asterisks 24 is four. If it is not, then decision box 65 determines whether the card is setup card 35. This is likewise done based on whether the number of detected asterisks 24 is three. If it is not, then the operation is terminated. If, however, decision box 63 determines that recording card 1 is the one being scanned, then the steps shown in FIG. 7 are carried out.

Figure 7:
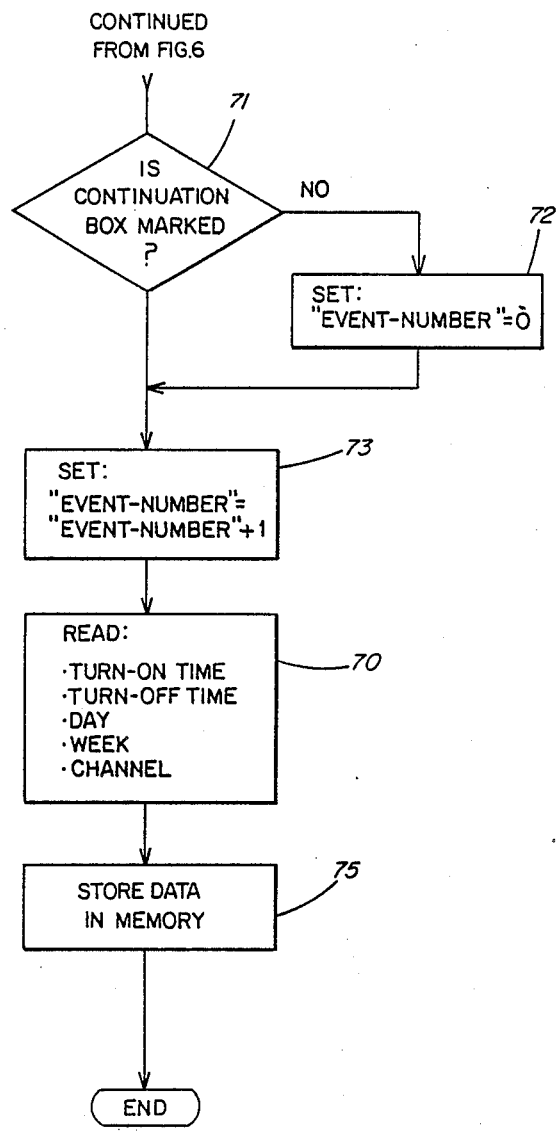
FIG. 7 is a flow chart showing details of the steps followed to capture and store the data for the programming of the electrically powered equipment.

Turning now to FIG. 7, decision box 71 determines whether the continuation box 20 is marked. If not, then the event number stored in memory 54 is set to zero, per box 72. Consequently, in box 73 the event number is set to 1. If, however, decision box 71 indicates that the continuation box 20 has been marked, then the operation proceeds directly to 73 where the event number, whatever it is then, is increased by one. Thus, if one event had already been entered with the utilization of another card 1, then the already stored event number would be 1. Consequently, in this sequence, box 73 will increase the event number to 2. A similar operation will, of course, occur regardless of how many recording cards 1 are utilized.

The various boxes which have been filled in on card 1 are read by scanner 31. This is all represented by box 70. Box 75 is utilized to store the scanned data into the appropriate memory location of memory 54. It is contemplated that the memory will be organized in a matrix such that each row in memory corresponds to one event. The row is divided into columns, with each column corresponding to a logical set of information on card 1. Each column contains the same number as the maximum number of boxes that can be marked for each logical set of information (e.g. hour of day —12, quarter hour —3, AM/PM —2, etc.). Consequently, when it is determined that a particular box in a particular row of card 1 has been filled in, say box $5_2$, it will be placed in a "cell" located at the intersection of the first row (corresponding to event number 1) and the second column, and only the second of the twelve bits will be a 1.

Figure 8:
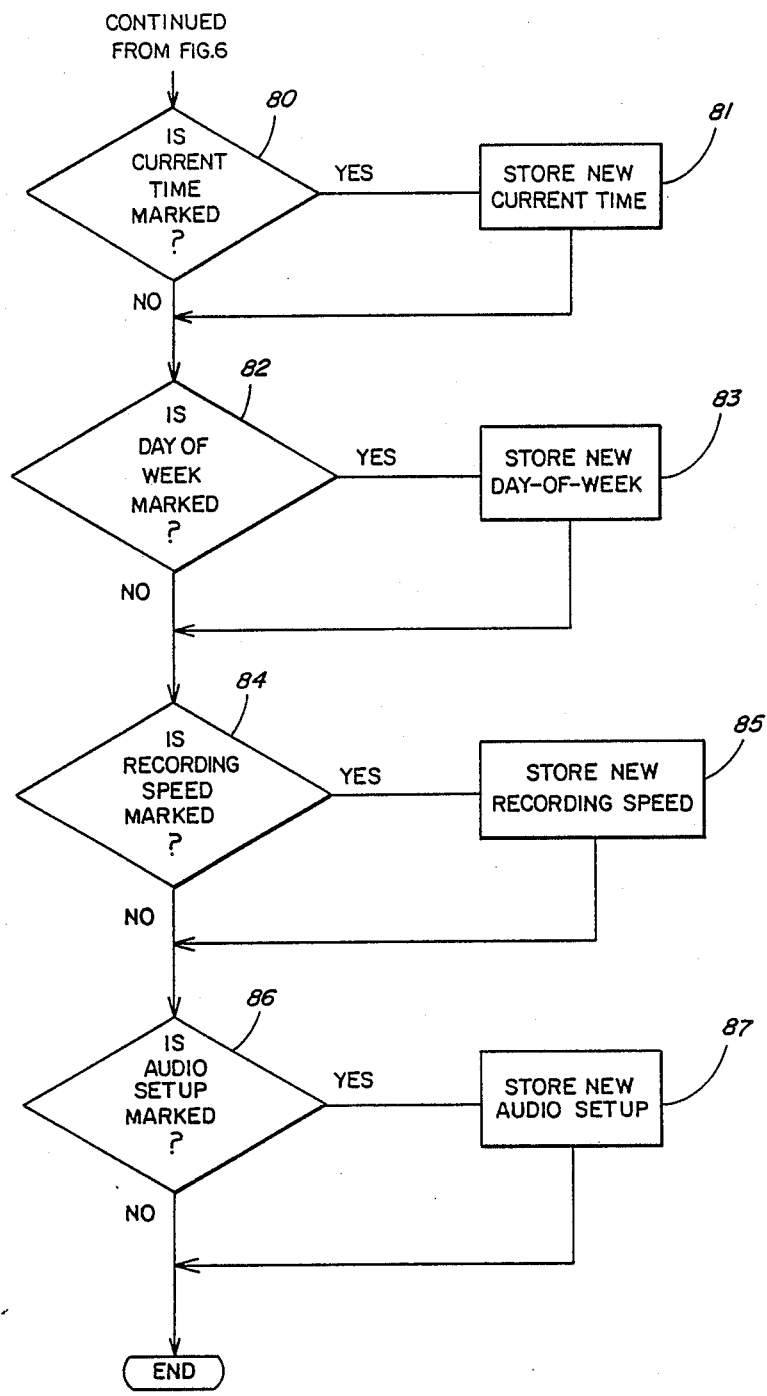
FIG. 8 is a flow chart showing details of the steps followed to set up the electrically powered equipment.

Thus, as the operations depicted in FIG. 7 are terminated, all the data read by scanner 31 has been appropriately stored in processor-and-memory circuit 54. If the card carried by cassette 23 is determined by box 65 (see FIG. 6) to be setup card 35, then the steps depicted in FIG. 8 are carried out. Turning to FIG. 8, decision box 80 determines whether any information has been input in rows 39, 40 or 41. If such information has been input, then box 81 is utilized to store the newly input time. Decision box 82 determines whether any information has been input into row 42 of card 35. If it has, then the new day-of-the-week information is input per box 83. Likewise, if row 43 has been marked with any information, then decision box 84 so indicates to box 85 which then carries out the input of such a newly selected recording speed. Finally, decision box 86 determines whether any data has been entered into row 45 of card 35. If it has, then box 87 stores the newly selected audio data.

Figure 9:
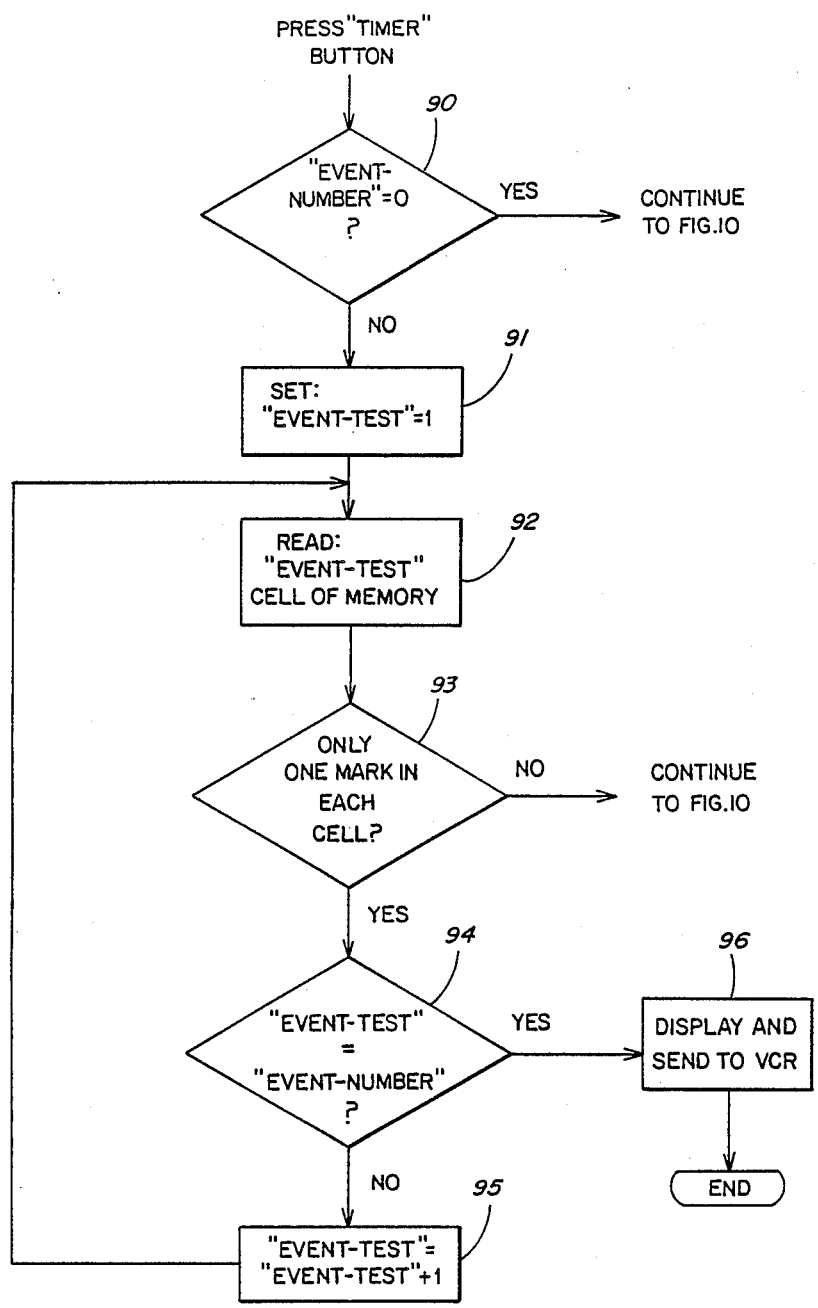
FIG. 9 is a flow chart showing the steps followed to check the validity of information marked on the program and/or setup cards and actuate programming of the VCR.
Figure 10:
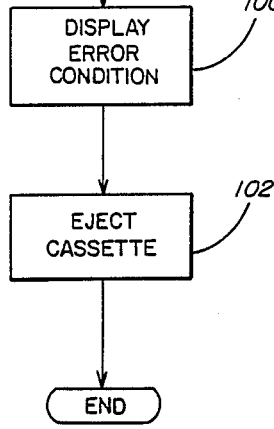
FIG. 10 is a flow chart showing the steps followed when an error condition is determined in the information obtained from the recording card.

With the completion of all of the above steps, sufficient data has been stored in memory 54 to place VCR 25 in ready condition for carrying out a time-dependent operation. Only actuation of the time-dependent operation remains. If such actuation occurs, then the steps shown in FIGS. 9 and 10 are carried out. Such actuation can be triggered by a conventional "timer" button (not shown). However, such data is not yet ready to be used for programming the VCR. Its accuracy must first be checked. This is done in accordance with the steps depicted in FIGS. 9 and 10, as described below.

If, after the "timer" button is pressed, the event number is determined by box 90 of FIG. 9 to be zero, this means that entry of programming information via scanner 31 has not taken place. Consequently, decision box 90 leads to FIG. 10 which causes an error condition to be displayed per box 100, followed by ejection of the cassette per box 102. If, however, some event has been programmed, then a testing operation is carried out by virtue of boxes 91–96. Specifically, box 91 indicates that a testing operation labeled "event-test" is assigned the number 1 to indicate that the first such operation is about to take place. In box 92, the actual test is carried out. For example, this involves retrieving from memory 54 information in each cell. Decision box 93 then determines whether only one piece of information has been entered in each cell. Such a test determines whether conflicting information has been inadvertently been marked. Thus, it is clear that two different hours cannot be marked for the same event in row 3 of card 1. Likewise, it is not possible to have both the AM and PM boxes $9_1$ and $9_2$ marked in row 7 of card 1. It is a check for this type of conflicting information which is carried out in decision box 93. If conflicting information is found by decision box 93, then this is indicative of an error condition and leads the process to the steps in FIG. 10 which have been described above. However, if no error condition is sensed, then box number 94 determines whether all the events which have been programmed have been suitably tested yet. If not, then box 95 leads back to a further testing sequence utilizing boxes 92 and 93. If, however, all the events have been tested, then box 96 indicates that the input data is error free and, as a result, displays it for viewing by the user. Also, the data is input to the VCR control circuitry 55 for use in a conventional fashion just as if the data had been input via the well-known type of manual controls 56.

To summarize the above, once the programming information has been stored in memory 54, actual time-dependent programming is triggered by a "timer" button (not shown) on the VCR. Such a button is conventionally available on VCR's. The timer button is set in order to place the VCR in the time-dependent operating mode so that it will automatically carry out the pre-programmed functions at the designated times. No further details concerning such actuation are believed necessary. If the pre-programmed functions are input in accordance with the invention, the data stored in memory 54 is first checked and, if found satisfactory, it is transferred to the VCR to implement the designated time-dependent programming.

With the invention as described above, it is possible to achieve the objects previously set out. Specifically, it is unnecessary for the operator to become familiar with the manual controls 56. Instead, all that needs to be done is to mark a simple and easy to use programming card. Consequently, even a non-technically oriented person can quickly and readily make use of the time-dependent VCR features regardless of the particular VCR make and model. Furthermore, by utilizing the medium, such as a cassette, to carry the control markings, one person can program for the benefit of another (such as a parent for a child) with little or no communication between them being required and without being subject to the date range (i.e. how far in advance can VCR be programmed) and event-number limitations of the VCR. The medium itself carries its own programming information. Thus, it can be prepared anytime for time-dependent programming, just as long as the cassette is inserted into the VCR within the VCR date range. Also, since the information is stored on the cassette, it can remain there until required without the need to utilize the memory of the VCR which might otherwise become overtaxed. Moreover, utilizing the medium in this manner allows "programming" to take place at one location for use in another location. The VCR itself, in other words, need not be accessible when the time-dependent data is stored on the medium. Also, a greater degree of assurance is available that the correct programs will be taped because the programming information is on the cassette. With the normal entry approach, settings can be changed or overridden by another member of the family. In addition, this technique of the invention permits free use of the VCR even after the programming data has been entered. With the conventional manual technique, once a person has entered the data and activated the "timer" button, the VCR is locked into its time-dependent operational mode. However, with the invention the programming information is entered on the cassette thereby leaving the VCR, if the marked cassette has not been inserted into it, freely usable by anyone. Furthermore, even if the marked cassette is replaced in the VCR by another, all that needs to be done is to simply re-insert it to obtain the correct time-dependent operation. Consequently, it can readily be appreciated that the technique of this invention not only simplifies the time-dependent programming operation, but at the same time, makes it more flexible and more powerful.

Although a preferred embodiment of the present invention has been described in detail above, various modifications thereto will be readily apparent to one with ordinary skill in the art. For example, various versions of recording card 1 can be utilized. FIG. 11 depicts one such other version which has been specifically designed to enable the programming of two events with a single card. The upper part is utilized for programming the first event whereas the lower half is utilized for programming the second event. Also, a "continuation" box 110 is provided which corresponds to continuation box 20 in FIG. 1 to indicate that events are being programmed additional to those previously stored with another card. Also, FIG. 12 discloses one other such embodiment for programming card 1 which has been specifically designed to enable selection of a program viewable at the same time, but in successive weeks and on different days thereof.

In addition to such modifications, the preferred embodiment has been described with respect to scanner 31 specifically positioned and adapted to read the card as the cassette 23 is in motion relative to it. However, various embodiments might be contemplated in which the reading operation is carried out with cassette 23 already seated in its final position within VCR 23. The scanner might itself be electro-mechanically movable, or some type of electronic and/or electromechanical scanning can take place. In addition, it should be clear that circuitry for inputting the data in accordance with the preferred embodiment can be utilized in conjunction with the conventional manual controls 56 for inputting such data. The VCR will then operate in accordance with whatever data is input, regardless of whether it has been entered with controls 56 or via a programming card. Furthermore, instead of utilizing pocket 21 to retain the programming card, the latter can be made with a self-sticking backing, or markings can be applied directly to the medium. Also, one arrangement for memory 54 has been described in detail, but other arrangements can also be used as well. Furthermore, the checks performed on the integrity of data marked on a programming card, as per FIG. 9, can be performed automatically while each cassette is being positioned, for example, rather than being dependent on actuation of the "timer" button, as disclosed above. All such modifications are meant to be included within the scope of the invention as defined by the following claims.

I claim:

1. Apparatus for controlling an electrically powered device that provides recording signals to a signal storage means, comprising:
  a signal storage means physically separable from the device and adapted to be selectively brought into an operative position therewith;
  means in said device for providing recording signals to said signal storage means when it is brought into said operative position relative to said device;
  a support surface on said signal storage means;
  a plurality of first designated locations carried on said support surfaces corresponding to a multiplicity of choices for time of day, and a plurality of second designated locations carried on said support surface corresponding to functions of said device associated with providing recording signals to said signal storage means by said recording signal providing means, each of said first and second designated locations being adapted to be marked with indicia indicative that it has been selected;

means in said device for detecting the indicia at said first and second designated locations as said signal storage means is positioned for the providing of recording signals thereto; and means responsive to said detecting means for actuating said device to perform functions associated with recording as set by indicia at the second designated locations and based on the time of day as set by indicia at the first designated locations.

2. The apparatus of claim 1, wherein said signal storage means comprises an enclosure in which a signal storage medium is housed, said support surface being carried on said enclosure, said device comprising (a) means for receiving said enclosure therein at said operative position, and (b) said detecting means.

3. The apparatus of claim 2, wherein said detecting means detects said indicia during motion of the signal storage means toward the operative position in said receiving means.

4. The apparatus of claim 3, wherein said support surface carries synchronizing markings thereon, and said detecting means detects said synchronizing markings to synchronize detection of the indicia with motion of the signal storage means.

5. The apparatus of claim 1, wherein said actuating means comprises memory means for storing output signals from said detecting means corresponding to said indicia.

6. The apparatus of claim 1, wherein said support surface comprises a card secured to said signal storage means.

7. The apparatus of claim 6, further comprising means for removably securing said card to the signal storage means.

8. The apparatus of claim 7, wherein said securing means comprises a pocket affixed to the signal storage means and sized to accommodate said card therein, and with its side facing the detecting means beings transparent.

9. The apparatus of claim 7, further comprising means in said device for checking the integrity of data corresponding to at least some of the indicia on said support surface.

10. Apparatus for use in controlling an electrically powered device that provides recording signals to a signal storage means, comprising:

a signal storage unit having storing means to which recording means in said device provide recording signals, said unit being physically separatable from the device and adapted to be selectively brought into an operative position therewith;

a support surface on said signal storage unit; and a plurality of first designated locations carried on said support surface corresponding to a multiplicity of choices for time of day, and a plurality of second designated locations carried on said support surface corresponding to functions of said device associated with providing recording signals to said storing means by said recording means, each of said first and second designated locations being adapted to be marked with indicia indicative that it have been selected, with said indicia being adapted to be detected by means in said device for detecting the indicia at said first and second designated locations as said signal storage means is brought into said operative position relative to said device;

whereby an output of said detecting means representative of said indicia is adapted to actuate said device to perform functions associated with recording as set by indicia at the second designated locations and based on the time of day as set by indicia at the first designated locations.

11. The apparatus of claim 10, wherein said support surface comprises a card secured to said signal storage unit.

12. The apparatus of claim 11, further comprising means for removably securing said card to the signal storage unit.

13. The apparatus of claim 12, wherein said securing means comprises a pocket affixed to the signal storage unit and sized to accommodate said card therein, and with its side that is adapted to face the detecting means being transparent.

14. The apparatus of claim 10, wherein said signal storing unit comprises an enclosure in which said storing means is housed, said support surface being carried on said enclosure.

15. A method for controlling an electrically powered device that provides recording signals to a signal storage unit, comprising the steps of:

providing a signal storage unit that is physically separatable from the device and adapted to be selectively brought into an operative position therewith;

providing recording signals to said signal storage unit;

providing a support surface on said signal storage unit;

providing a plurality of first designated location carried on said support surface corresponding to a multiplicity of choices for time of day, and a plurality of second designated locations carried on said support surface corresponding to functions of said device associated with providing recording signals to said signal storage unit, each of said first and second designated locations being adapted to be marked with indicia indicative that it has been selected;

detecting the indicia at said first and second designated locations as said signal storage unit is positioned at said operative position for the providing of recording signals thereto; and actuating said device to perform functions associated with recording as set by indicia at the second designated locations and based on the time of day as set by indicia at the first designated locations.

* * * * *